United States Patent
Zhang et al.

(10) Patent No.: US 12,482,824 B2
(45) Date of Patent: Nov. 25, 2025

(54) POSITIVE ELECTRODE PLATE AND LITHIUM-ION BATTERY COMPRISING THE POSITIVE ELECTRODE PLATE

(71) Applicant: ZHUHAI COSMX BATTERY CO., LTD., Zhuhai (CN)

(72) Inventors: Jian Zhang, Zhuhai (CN); Chong Peng, Zhuhai (CN)

(73) Assignee: ZHUHAI COSMX BATTERY CO., LTD., Zhuhai (CN)

( * ) Notice: Subject to any disclaimer, the term of this patent is extended or adjusted under 35 U.S.C. 154(b) by 0 days.

(21) Appl. No.: 19/181,376

(22) Filed: Apr. 17, 2025

(65) Prior Publication Data
US 2025/0246632 A1 Jul. 31, 2025

Related U.S. Application Data

(63) Continuation of application No. 18/168,704, filed on Feb. 14, 2023, which is a continuation of application No. PCT/CN2021/137729, filed on Dec. 14, 2021.

(30) Foreign Application Priority Data

Dec. 14, 2020 (CN) .......................... 202011468013.3
Dec. 14, 2020 (CN) .......................... 202011469365.0
Dec. 14, 2020 (CN) .......................... 202011469382.4

(51) Int. Cl.
*H01M 4/1391* (2010.01)
*H01M 4/62* (2006.01)
(Continued)

(52) U.S. Cl.
CPC ......... *H01M 4/623* (2013.01); *H01M 4/1391* (2013.01); *H01M 4/625* (2013.01); *H01M 10/0525* (2013.01); *H01M 2004/028* (2013.01)

(58) Field of Classification Search
None
See application file for complete search history.

(56) References Cited

U.S. PATENT DOCUMENTS

2019/0296335 A1   9/2019  Yao
2020/0099057 A1*  3/2020  Nakayama .............. H01M 4/62
(Continued)

FOREIGN PATENT DOCUMENTS

CN    109119619 A    1/2019
EP    3742528 A1    11/2020

OTHER PUBLICATIONS

Solvay, Solef PVDF for Li-Ion Batteries. (Year: 2017).*
The extended European search report received in the counterpart EP application 21905690.0, dated Feb. 19, 2025, 12 pages.

*Primary Examiner* — Carlos Barcena
(74) *Attorney, Agent, or Firm* — K&L Gates LLP

(57) ABSTRACT

Disclosed are a positive electrode plate and a lithium-ion battery including the same. The positive plate includes a positive electrode current collector and a positive electrode coating layer; and the positive electrode coating layer includes a first coating layer and a second coating layer, wherein the first coating layer is coated on the positive electrode current collector surface, and the second coating layer is coated on the first coating layer surface. The lithium-ion battery has a good safety performance, and when mechanical misuse (needling, weight impact) occurs, the probability of battery fire failure is significantly reduced.

18 Claims, 4 Drawing Sheets

(51) Int. Cl.
*H01M 10/0525* (2010.01)
*H01M 4/02* (2006.01)

(56) References Cited

U.S. PATENT DOCUMENTS

| | | |
|---|---|---|
| 2020/0144600 A1* | 5/2020 | Zhong ............... H01M 10/0525 |
| 2020/0144605 A1 | 5/2020 | Su et al. |
| 2023/0155125 A1* | 5/2023 | Lee .................... H01M 10/052 |
| | | 429/221 |

* cited by examiner

POSITIVE ELECTRODE PLATE AND LITHIUM-ION BATTERY COMPRISING THE POSITIVE ELECTRODE PLATE

CROSS-REFERENCE TO RELATED APPLICATIONS

This application is a continuation of U.S. patent application Ser. No. 18/168,704, filed on Feb. 14, 2023, which is a continuation of International Application No. PCT/CN2021/13779, filed on Dec. 14, 2021, which claims the priorities to Chinese Patent Application No. 202011469382.4, filed on Dec. 14, 2020, Chinese Patent Application No. 202011469365.0, filed on Dec. 14, 2020, and Chinese Patent Application No. 202011468013.3, filed on Dec. 14, 2020, the disclosures of which are hereby incorporated by reference in their entireties.

TECHNICAL FIELD

The present disclosure relates to the technical field of lithium-ion batteries, in particular, to a positive electrode plate and a lithium-ion battery including the positive electrode plate.

BACKGROUND

Lithium-ion batteries are widely used in smart phones, laptops, Bluetooth, wearable devices and other fields due to their high platform voltage, high energy density, no memory effect, and long life. However, in some extreme cases, such as when the lithium-ion battery suffers mechanical damage (acupuncture, weight impact, etc.), an internal short circuit will occur which will cause the battery to catch fire and fail, which has a great safety hazard.

It is found that when a lithium-ion battery has an internal short circuit, there will be multiple short circuit modes, of which the short circuit between the positive electrode current collector foil and the negative electrode plate is the most dangerous mode.

SUMMARY

The present disclosure provides a positive electrode plate and a lithium-ion battery including the positive electrode plate. The use of the positive electrode plate can solve the problem of the lithium-ion battery catching fire and failing in the case of mechanical misuse, and improve the lithium-ion battery's safety performance, while the cycle performance of the lithium-ion battery is not affected, and is comparable to the cycle performance of the existing lithium-ion battery. The safety performance of the lithium-ion battery is significantly improved on the premise of maintaining the cycle performance of the lithium-ion battery.

The present disclosure is achieved through the following technical solutions:

A positive electrode plate, including a positive electrode current collector and a positive electrode coating layer; wherein: the positive electrode coating layer includes a first coating layer and a second coating layer, wherein the first coating layer is coated on the positive electrode current collector surface, and the second coating layer is coated on the first coating layer surface; the first coating layer includes an inorganic filler, a first conductive agent and a first binder; the second coating layer includes a positive electrode active material, a second conductive agent and a second binder; a content of the first binder in the first coating layer is greater than a content of the second binder in the second coating layer; the positive electrode current collector is bonded with a part of the first binder, and a part of the positive electrode active material is bonded with another part of the first binder;

and, the positive electrode plate satisfies at least one of the following conditions (1) to (7):
(1) a bonding force between the first coating layer and the positive electrode current collector is greater than 30 N/m;
(2) a bonding force between the first coating layer and the positive electrode current collector is greater than a bonding force between the first coating layer and the second coating layer;
(3) a bonding force between the first coating layer and the positive electrode current collector is greater than a bonding force between positive electrode active material particles of the second coating layer;
(4) after the positive electrode coating layer of the positive electrode plate is peeled off, a maximum thickness of the positive electrode coating layer remaining on the positive electrode current collector is greater than or equal to 2 μm;
(5) a thickness of the positive electrode coating layer remaining on the positive electrode current collector after the positive electrode coating layer of the positive electrode plate is peeled off accounts for more than 5% of a thickness of the positive electrode coating layer on the positive electrode current collector before peeling off;
(6) a total mass of the positive electrode coating layer remaining on the positive electrode current collector after the positive electrode coating layer of the positive electrode plate is peeled off accounts for more than 10% of a total mass of the positive electrode coating layer on the positive electrode current collector before peeling off;
(7) a total area of the positive electrode coating layer remaining on the positive electrode current collector after the positive electrode coating layer of the positive electrode plate is peeled off accounts for more than 70% of a total area of the positive electrode coating layer before peeling off.

The study found that when the bonding force between the first coating layer and the positive electrode current collector is greater than the bonding force between the first coating layer and the second coating layer, and/or, when the bonding force between the first coating layer and the positive electrode current collector is greater than the bonding force between the particles of the positive electrode active material of the second coating layer, it can be realized that the surface of the positive electrode current collector is well protected by the first coating layer and not easy to be exposed in the case of mechanical misuse (such as needling, weight impact), which reduces the contact probability between the positive electrode current collector and the negative electrode plate, thereby reducing the short circuit probability between the positive electrode current collector and the negative electrode plate, and improving the safety of the battery.

When the bonding force between the first coating layer and the positive electrode current collector is greater than 30 N/m, it can be achieved that the surface of the positive electrode current collector will be well protected by the first coating and not easy to be exposed in the case of mechanical misuse (such as needling, weight impact), which reduces the contact probability between the positive electrode current collector and the negative electrode plate, thereby reducing the short circuit probability between the positive electrode current collector and the negative electrode plate, and improving the safety of the battery.

When the positive electrode coating layer of the positive electrode plate is peeled off (the test process is described below), the thickness of the positive electrode coating layer remaining on the positive electrode current collector accounts for more than 5% of the thickness of the positive electrode coating layer on the positive electrode current collector before peeling off. The positive electrode current collector surface is well protected by the first coating layer and not easy to be exposed in the event of mechanical misuse (such as acupuncture, weight impact), so that the contact probability between the positive electrode current collector and the negative electrode is reduced, thereby reducing the short-circuit probability between the positive electrode current collector and the negative electrode plate and improving the safety of the battery.

After the positive electrode coating layer of the positive electrode plate is peeled off (the test process is described below), the total mass of the positive electrode coating layer remaining on the positive electrode current collector accounts for more than 10% of the total mass of the positive electrode coating layer on the positive electrode current collector before peeling off. The use of the positive electrode plate can further reduce the contact probability between the positive electrode current collector and the negative electrode plate in the case of mechanical misuse (such as needling, weight impact), thereby reducing short circuit probability between the positive electrode current collector and the negative electrode plate, and improving the safety of the battery.

After the positive electrode coating layer of the positive electrode plate is peeled off (the test process is described below), the total area of the positive electrode coating layer remaining on the positive electrode current collector accounts for more than 70% of the total area of the positive electrode coating layer on the positive electrode current collector before peeling off. The use of the positive electrode plate can further reduce the contact probability between the positive electrode current collector and the negative plate in the case of mechanical misuse (such as needling, weight impact), thereby reducing short circuit probability between the positive electrode current collector and the negative electrode plate, and improving the safety of the battery.

The present disclosure also provides a lithium-ion battery, the lithium-ion battery includes the above positive electrode plate.

Beneficial Effects of the Present Disclosure

The present disclosure provides a positive electrode plate and a lithium-ion battery including the positive electrode plate. The positive electrode plate satisfies at least one of the following conditions (1) to (7): (1) a bonding force between the first coating layer and the positive electrode current collector is greater than 30 N/m; (2) a bonding force between the first coating layer and the positive electrode current collector is greater than a bonding force between the first coating layer and the second coating layer; (3) a bonding force between the first coating layer and the positive electrode current collector is greater than a bonding force between positive electrode active material particles of the second coating layer; (4) after the positive electrode coating layer of the positive electrode plate is peeled off, a maximum thickness of the positive electrode coating layer remaining on the positive electrode current collector is greater than or equal to 2 μm; (5) a thickness of the positive electrode coating layer remaining on the positive electrode current collector after the positive electrode coating layer of the positive electrode plate is peeled off accounts for more than 5% of a thickness of the positive electrode coating layer on the positive electrode current collector before peeling off; (6) a total mass of the positive electrode coating layer remaining on the positive electrode current collector after the positive electrode coating layer of the positive electrode plate is peeled off accounts for more than 10% of a total mass of the positive electrode coating layer on the positive electrode current collector before peeling off; (7) a total area of the positive electrode coating layer remaining on the positive electrode current collector after the positive electrode coating layer of the positive electrode plate is peeled off accounts for more than 70% of a total area of the positive electrode coating layer before peeling off. The lithium-ion battery including the positive electrode plate has good safety performance, and the probability of battery fire failure is greatly reduced when mechanical misuse (needling, weight impact) occurs.

DETAILED DESCRIPTION OF THE EMBODIMENTS

Figure 1:
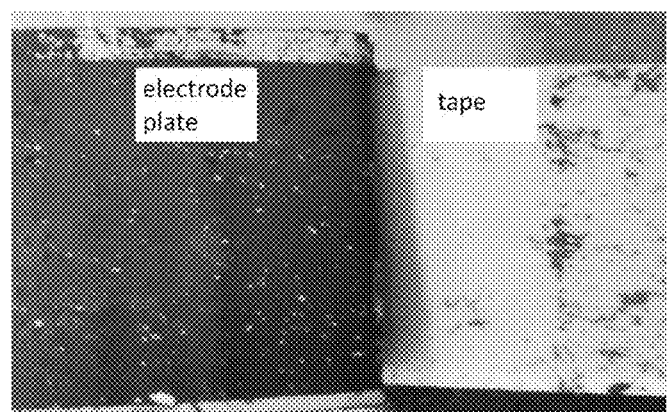
FIG. 1 shows the surface state of the electrode plate after the peeling test in Example 1.

As described above, the present disclosure provides a positive electrode plate, which includes a positive electrode current collector and a positive electrode coating layer; wherein: the positive electrode coating layer includes a first coating layer and a second coating layer, wherein the first coating layer is coated on the positive electrode current collector surface, and the second coating layer is coated on the first coating layer surface; the first coating layer includes an inorganic filler, a first conductive agent and a first binder; the second coating layer includes a positive electrode active material, a second conductive agent and a second binder; a content of the first binder in the first coating layer is greater than a content of the second binder in the second coating layer; the positive electrode current collector is bonded with a part of the first binder, and a part of the positive electrode active material is bonded with another part of the first binder;

and the positive electrode plate satisfies at least one of the following conditions (1) to (7):

(1) a bonding force between the first coating layer and the positive electrode current collector is greater than 30 N/m;

(2) a bonding force between the first coating layer and the positive electrode current collector is greater than a bonding force between the first coating layer and the second coating layer;

(3) a bonding force between the first coating layer and the positive electrode current collector is greater than a bonding force between positive electrode active material particles of the second coating layer;

(4) after the positive electrode coating layer of the positive electrode plate is peeled off, a maximum thickness of the positive electrode coating layer remaining on the positive electrode current collector is greater than or equal to 2 μm;

(5) a thickness of the positive electrode coating layer remaining on the positive electrode current collector after the positive electrode coating layer of the positive electrode plate is peeled off accounts for more than 5% of a thickness of the positive electrode coating layer on the positive electrode current collector before peeling off;

(6) a total mass of the positive electrode coating layer remaining on the positive electrode current collector after the positive electrode coating layer of the positive electrode plate is peeled off accounts for more than 10% of a total mass of the positive electrode coating layer on the positive electrode current collector before peeling off;

(7) a total area of the positive electrode coating layer remaining on the positive electrode current collector after the positive electrode coating layer of the positive electrode plate is peeled off accounts for more than 70% of a total area of the positive electrode coating layer before peeling off.

Exemplarily, the positive electrode plate satisfies (1) that the bonding force between the first coating layer and the positive electrode current collector is greater than 30 N/m.

Exemplarily, the positive electrode plate satisfies (2) the bonding force between the first coating layer and the positive electrode current collector is greater than the bonding force between the first coating layer and the second coating layer; and/or, (3) the bonding force between the first coating layer and the positive electrode current collector is greater than the bonding force between the positive electrode active material particles of the second coating layer; and (4) after the positive electrode coating layer of the positive electrode plate is peeled off, the maximum thickness of the positive electrode coating layer remaining on the positive electrode current collector is greater than or equal to 2 μm.

Exemplarily, the positive electrode plate satisfies (2) the bonding force between the first coating layer and the positive electrode current collector is greater than the bonding force between the first coating layer and the second coating layer; and/or, (3) the bonding force between the first coating layer and the positive electrode current collector is greater than the bonding force between the positive electrode active material particles of the second coating layer; and (5) after the positive electrode coating layer of the positive electrode plate is peeled off, the thickness of the positive electrode coating layer remaining on the positive electrode current collector accounts for more than 5% of the thickness of the positive electrode coating layer on the positive electrode current collector before peeling off.

Exemplarily, the positive electrode plate satisfies (2) the bonding force between the first coating layer and the positive electrode current collector is greater than the bonding force between the first coating layer and the second coating layer; and/or, (3) the bonding force between the first coating layer and the positive electrode current collector is greater than the bonding force between the positive electrode active material particles of the second coating layer; and (6) after the positive electrode coating layer of the positive electrode plate is peeled off, the total mass of the positive electrode coating layer remaining on the positive electrode current collector accounts for more than 10% of the total mass of the positive electrode coating layer on the positive electrode current collector before peeling off.

Exemplarily, the positive electrode plate satisfies (2) the bonding force between the first coating layer and the positive electrode current collector is greater than the bonding force between the first coating layer and the second coating layer; and/or, (3)) the bonding force between the first coating layer and the positive electrode current collector is greater than the bonding force between the positive electrode active material particles of the second coating layer; and (7) after the positive electrode coating layer of the positive electrode plate is peeled off, the total area of the positive electrode coating layer remaining on the positive electrode current collector accounts for more than 70% of the total area of the positive electrode coating layer before peeling off.

According to the present disclosure, the maximum thickness of the positive electrode coating layer remaining on the positive electrode current collector is greater than or equal to the thickness of the first coating layer. At this time, it can be shown that the first coating layer in some areas is hardly peeled off, the bonding performance is high, and the safety performance of the electrode plate is good.

In the present disclosure, the maximum thickness of the remaining positive electrode coating layer refers to the maximum thickness of the positive electrode coating layer remaining on the positive electrode current collector surface.

In the present disclosure, the total mass of the remaining positive electrode coating layer refers to the sum of the mass of the positive electrode coating layer remaining on the surface of the positive electrode current collector, and the total mass of the positive electrode coating layer on the positive electrode current collector before peeling off refers to the sum of the mass of the positive electrode coating layer of the positive electrode current collector surface before peeling off.

In the present disclosure, the total area of the remaining positive electrode coating layer refers to the sum of the areas of the positive electrode coating layer remaining on the positive electrode current collector surface, and the total area of the positive electrode coating layer on the positive electrode current collector before peeling off refers to the sum of the area of the positive electrode coating layer of the positive electrode current collector surface before peeling off.

In the present disclosure, the thickness of the remaining positive electrode coating layer refers to the thickness of the positive electrode coating layer remaining on the surface of the positive electrode current collector, and the thickness of the positive electrode coating layer on the positive electrode current collector before peeling off refers to the thickness of the positive electrode coating layer on the front positive electrode current collector surface before peeling off.

In the present disclosure, the bonding force between the positive electrode active material particles of the second coating layer refers to the bonding force between the positive electrode active material particles forming the second coating layer.

According to the present disclosure, the bonding force between the first coating layer and the positive electrode current collector is greater than 30 N/m.

According to the present disclosure, the bonding force between the first coating layer and the positive electrode current collector is greater than or equal to 35 N/m and less than or equal to 300 N/m; preferably, the bonding force between the first coating layer and the positive electrode current collector is greater than or equal to 35 N/m and less than or equal to 200 N/m.

Exemplarily, the bonding force between the first coating layer and the positive electrode current collector is 35 N/m, 40 N/m, 45 N/m, 50 N/m, 55 N/m, 60 N/m, 65 N/m, 70 N/m, 75 N/m, 80 N/m, 85 N/m, 90 N/m, 100 N/m, 110 N/m, 120 N/m, 130 N/m, 140 N/m, 150 N/m, 160 N/m, 170 N/m, 180 N/m, 190 N/m or 200 N/m.

In the present disclosure, the bonding force is measured after the lithium-ion battery is completely discharged and the positive electrode plate is left for 2 hours. Exemplarily, the lithium-ion battery is completely discharged (discharged to 3.0V at 0.5C) and then dissected; the positive electrode plate is taken out and placed in an environment with a temperature of 25±3° C. and a dew point of <−30° C. for 2 h; and then the positive electrode plate is cut into small pieces of positive electrode plate with a length of 240 mm and a width of 30 mm. The NITTO No. 5000NS tape is cut into small pieces of tape with a length of 200 mm and a width of 24 mm; one side of the small piece of tape is sticked on the on the steel plate (260 mm*50 mm) and the positive electrode plate is sticked on the other side of the tape, making sure that the positive electrode plate completely covers the tape; a hand-held roller (diameter of 95 mm, width of 45 mm, weight of 2 kg) is used to roll back and forth for 3 times, making the positive electrode plate and the tape glued together; and then the tensile machine (the tensile machine model Dongguan Kejian KJ-1065 series) is used to test (180 degree peeling), which automatically records the tensile force value that changes with the peeling displacement. The curve of tensile force as a function of the peeling displacement is drawn, in which the abscissa is the peeling displacement and the ordinate is the tensile force value. The bonding force is defined as the tensile force value where the curve is flat and the peeling displacement is greater than 5 mm.

According to the present disclosure, only the second coating layer of the positive electrode current collector surface, and/or part of the particles of the first coating layer can be peeled off from the positive electrode current collector surface after the peel test.

Exemplarily, on the surface of the electrode plate after the peel test, only part of the particles of the second coating layer are peeled off from the positive electrode plate, and only the particles of the positive electrode active material of the second coating layer can be detected on the surface of the peeled electrode plate, and no particles of the first coating layer can be detected; or, after the peel test, some particles of the coating layer of the electrode plate surface are peeled off from the positive electrode plate; and the surface of the peeled electrode plate can detect the particles of the inorganic filler of the first coating layer and the particles of the positive electrode active material of the second coating layer, but the positive electrode current collector is not exposed.

More specifically, when the inorganic filler is lithium ferrous phosphate and the positive electrode active material is lithium cobalt oxide, after the positive electrode coating layer of the positive electrode plate is peeled off, Co and O elements on the surface of the remaining positive electrode coating layer on the positive current collector were detected by EDS (Energy Dispersive Spectrometer). This result at least indicates that the bonding force between the first coating layer and the positive electrode current collector is greater than the bonding force between the first coating layer and the second coating layer, and/or, the bonding force between the first coating layer and the positive electrode current collector is greater than the bonding force between the particles of the positive electrode active material of the second coating layer.

According to the present disclosure, after the positive electrode coating layer of the positive electrode plate is peeled off, the thickness of the positive electrode coating layer remaining on the positive electrode current collector accounts for more than 10% or 20% or 30% or 40% or 50% or 60% of the thickness of the positive electrode coating layer on the positive electrode current collector before peeling off.

According to the present disclosure, after the positive electrode coating layer of the positive electrode plate is peeled off, the total mass of the positive electrode coating layer remaining on the positive electrode current collector accounts for more than 20% or 30% or 40% or 50% or 60% or 70% or 80% or 90% of the total mass of the positive electrode coating layer on the positive electrode current collector before peeling off.

According to the present disclosure, after the positive electrode coating layer of the positive electrode plate is peeled off, the total area of the positive electrode coating layer remaining on the positive electrode current collector accounts for more than 80% or 90% of the total area of the positive electrode coating layer on the positive electrode current collector before peeling off.

According to the present disclosure, the median particle size D50 of the inorganic filler is smaller than the median particle size D50 of the positive electrode active material.

In the present disclosure, the median particle size D50 of the inorganic filler is smaller than the median particle size D50 of the positive electrode active material, and the positive electrode active material in the second coating layer is embedded in the first coating layer (for details, see the SEM image shown in FIG. 10), so that a part of the first binder in the first coating layer is in contact with the positive electrode current collector, and another part of the first binder is in contact with the positive active electrode material; that is, a structure is formed in which the positive electrode current collector is bonded to a part of the first binder, and a part of the positive electrode active material is bonded to another part of the first binder.

According to the present disclosure, the median particle size D50 of the inorganic filler is 0.05-8 μm. The use of small particle size inorganic filler can make the first coating layer thinner and denser.

According to the present disclosure, the median particle size D50 of the positive electrode active material is 10-20 μm. Selection of this particle size range can provide a higher compaction density and increase capacity density.

According to the present disclosure, the first conductive agent and the second conductive agent forming the first coating layer and the second coating layer and their contents are the same or different, and the first binder and the second binder and their contents are the same or different.

According to the present disclosure, the mass percentage of each component in the first coating layer is: 40-93 wt % of the inorganic filler, 2-15 wt % of the first conductive agent, and 5-58 wt % of the first binder.

Preferably, the mass percentage of each component in the first coating layer is: 60-91 wt % of the inorganic filler, 3-10 wt % of the first conductive agent, and 8-30 wt % of the first binder. When the first binder is within this range, the first binder can have a good bonding effect with the positive electrode current collector. If the content of the first binder is too high, the energy density and deteriorate the performance of the cell will reduce. By the content being selected in this range, the first binder can be combined with the inorganic filler with a median particle size D50 of 0.05-8 μm to form a strong and dense bottom coating layer.

Exemplarily, the mass percentage of the inorganic filler in each component in the first coating layer is 40 wt %, 45 wt %, 48 wt %, 50 wt %, 55 wt %, 58 wt %, 60 wt %, 62 wt %, 65 wt %, 68 wt % %, 70 wt %, 72 wt %, 75 wt %, 78 wt %, 80 wt %, 82 wt %, 85 wt %, 88 wt %, 90 wt %, 92 wt %, 93 wt %.

Exemplarily, the mass percentage of the first conductive agent in each component in the first coating layer is 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %.

Exemplarily, the mass percentage of the first binder of in each component in the first coating layer is 5 wt %, 6 wt %, 7 wt %, 8 wt %, 9 wt %, 10 wt %, 11 wt %, 12 wt %, 13 wt %, 14 wt %. %, 15 wt %, 18 wt %, 20 wt %, 22 wt %, 25 wt %, 28 wt %, 30 wt %, 33 wt %, 35 wt %, 38 wt %, 40 wt %, 45 wt %, 48 wt %, 50 wt %, 55 wt %, 58 wt %.

According to the present disclosure, the mass percentage of each component in the second coating layer is: 93-99 wt % of positive active electrode material, 0.5-5 wt % of second conductive agent, and 0.5-2 wt % of second binder. Selecting the second binder in this content range provides better bonding results while maintaining a high energy density.

Preferably, the mass percentage of each component in the second coating layer is: 95-98 wt % of positive electrode active material, 1-3 wt % of second conductive agent, and 1-2 wt % of second binder.

Exemplarily, the mass percentage of the positive electrode active material in each component in the second coating layer is 93 wt %, 94 wt %, 95 wt %, 96 wt %, 97 wt %, 98 wt %, 99 wt %.

Exemplarily, the mass percentage of the second conductive agent in each component in the second coating layer is 0.5 wt %, 1 wt %, 1.5 wt %, 1.8 wt %, 2 wt %, 2.2 wt %, 2.5 wt %, 2.8 wt % wt %, 3 wt %, 3.5 wt %, 4 wt %, 4.5 wt %, 5 wt %.

Exemplarily, the mass percentage of the second binder in each component in the second coating layer is 0.5 wt %, 0.8 wt %, 1 wt %, 1.2 wt %, 1.5 wt %, 1.8 wt %, 2 wt %.

According to the present disclosure, the first conductive agent and the second conductive agent are the same or different, and are at least one independently selected from the group consisting of conductive carbon black, carbon nanotubes, and graphene.

According to the present disclosure, the first binder and the second binder are the same or different, and are at least one independently selected from the group consisting of polyvinylidene fluoride and modified polyvinylidene fluoride.

The polyvinylidene fluoride and the modified polyvinylidene fluoride are both commercially available products.

According to the present disclosure, the crystallinity of the first binder is less than 40%, because a low crystallinity is beneficial to have a better bonding effect.

According to the present disclosure, the crystallinity of the second binder is less than 40%, because a low crystallinity is beneficial to have a better bonding effect.

According to the present disclosure, the modified polyvinylidene fluoride is acrylate-modified polyvinylidene fluoride. The acrylate group contains carboxyl groups, which can form chemical bonds with the positive electrode current collector (such as aluminum foil) to achieve strong bonding with the positive electrode current collector.

According to the present disclosure, the molecular weight of the polyvinylidene fluoride or modified polyvinylidene fluoride is 1 million Da to 1.5 million Da, for example, 1.1 million Da or 1.3 million Da. Selecting a binder with a larger molecular weight can enhance the bonding performance, while reducing the content of the binder and enhancing its energy density.

According to the present disclosure, the inorganic filler is selected from lithium-containing transition metal oxides, specifically at least one selected from the group consisting of lithium cobalt oxide (LCO), nickel cobalt manganese ternary material (NCM), nickel cobalt aluminum ternary material (NCA), nickel cobalt manganese aluminum quaternary material (NCMA), lithium ferrous phosphate (LFP), lithium manganese phosphate (LMP), lithium vanadium phosphate (LVP), lithium manganate (LMO), and lithium rich manganese bases.

Alternatively, the inorganic filler is selected from ceramic materials, specifically at least one selected from the group consisting of alumina, boehmite, magnesium oxide, and magnesium hydroxide;

Alternatively, the inorganic filler is selected from a mixture of at least one of lithium-containing transition metal oxides and at least one of ceramic materials.

In the present disclosure, the inorganic filler plays the role of skeleton support.

According to the present disclosure, the positive electrode active material is at least one selected from the group consisting of lithium cobalt oxide (LCO), nickel cobalt manganese ternary material (NCM), nickel cobalt aluminum ternary material (NCA), nickel cobalt manganese aluminum quaternary material (NCMA), lithium ferrous phosphate (LFP), lithium manganese phosphate (LMP), lithium vanadium phosphate (LVP), and lithium manganate (LMO).

According to the present disclosure, the positive electrode current collector is selected from aluminum foil.

According to the present disclosure, the thickness of the positive electrode current collector is 8-15 μm.

According to the present disclosure, the thickness of the first coating layer (thickness after rolling) is 2-10 μm, such as 2 μm, 3 μm, 4 μm, 5 μm, 6 μm, 8 μm, 10 μm; the thickness of the second coating layer (the thickness after rolling) is 30-80 μm, such as 30 μm, 35 μm, 40 μm, 45 μm, 50 μm, 55 μm, 60 μm, 65 μm, 70 μm, 75 μm or 80 μm.

The present disclosure also provides a method for preparing the above positive electrode plate, the method including the following steps:
1) preparing the slurry for forming the first coating layer and the slurry for forming the second coating layer respectively;
2) coating the slurry for forming the first coating layer and the slurry for forming the second coating layer on both sides of the positive electrode current collector to prepare the positive electrode plate.

According to the present disclosure, in step 2), the coating is double-layer coating, gravure coating, extrusion coating, and transfer coating.

Exemplarily, step 2) specifically includes the following steps:

coating the slurry for forming the first coating layer on the surface of the positive electrode current collector to form the first coating layer, and coating the slurry for forming the second coating layer on the surface of the first coating layer to form the second coating layer, thereby obtaining a positive electrode plate.

The present disclosure also provides a lithium-ion battery, the lithium-ion battery includes the above positive electrode plate.

According to the present disclosure, the lithium-ion battery further includes a negative electrode plate.

According to the present disclosure, the negative electrode plate includes a negative electrode active material which is at least one selected from the group consisting of artificial graphite, natural graphite, meso-carbon microspheres, lithium titanate, silicon carbon negative electrode, and silicon oxygen negative electrode.

The present disclosure also provides the preparation method of above lithium-ion battery, and described method includes the steps:

a) preparing a positive electrode plate and a negative electrode plate;
b) subjecting the positive electrode plate and the negative electrode plate to the processes of rolling, slitting, filming, winding (or laminating), packaging, liquid injection, formation, capacity sorting, OCV and so on to obtain the lithium-ion battery.

The present disclosure will be further described in detail below with reference to specific embodiments. It should be understood that the following examples are only for illustrating and explaining the present disclosure, and should not be construed as limiting the protection scope of the present disclosure. All technologies implemented based on the above content of the present disclosure are covered within the intended protection scope of the present disclosure.

The experimental methods used in the following examples are conventional methods unless otherwise specified; and the reagents, materials, etc. used in the following examples can be obtained from commercial sources unless otherwise specified.

The modified PVDF used in the following examples is an acrylate-modified PVDF, commercially available under the designation Solef 5130. The acrylate-modified PVDF has a molecular weight of 1.1 million Da and a crystallinity of 30-32%.

The PVDF1 can be purchased commercially. The PVDF1 used in the following examples is a polyvinylidene fluoride under the brand name HSV-900 produced by Arkema Company. The molecular weight of the PVDF1 is 1 million Da, and the crystallinity is 25%.

The PVDF2 can be purchased commercially. The PVDF2 used in the following examples is a polyvinylidene fluoride with the brand name 2536 produced by Sinochem Lantian Group Co., Ltd. The molecular weight of the PVDF2 is 1.3 million Da, and the crystallinity is 43.5%.

In the description of the present disclosure, it should be noted that the terms of "first", "second" and the like are only used for descriptive purposes, and do not indicate or imply relative importance.

The test method of the bonding force test used in the following examples is as follows:

The lithium-ion battery is completely discharged (discharged to 3.0V at 0.5 C) and then dissected; the positive electrode plate is taken out and placed in an environment with a temperature of 25±3° C. and a dew point of <−30° C. for 2 h; and then the positive electrode plate is cut into small pieces of positive electrode plate with a length of 240 mm and a width of 30 mm. The NITTO No. 5000NS tape is cut into small pieces of tape with a length of 200 mm and a width of 24 mm; one side of the small piece of tape is sticked on the steel plate (260 mm*50 mm), and the positive electrode plate is sticked on the other side of the tape, making sure that the positive electrode plate completely covers the tape; a hand-held roller (diameter of 95 mm, width of 45 mm, weight of 2 kg) is used to roll back and forth for 3 times, making the positive electrode plate and the tape glued together; and then the tensile machine (the tensile machine model Dongguan Kejian KJ-1065 series) is used to test (180 degree peeling), which automatically records the tensile force value that changes with the peeling displacement. The curve of tensile force as a function of the peeling displacement is drawn, in which the abscissa is the peeling displacement and the ordinate is the tensile force value. The bonding force is defined as the tensile force value where the curve is flat and the peeling displacement is greater than 5 mm.

The test method for the total mass of the remaining positive electrode coating layer on the positive electrode current collector accounting for the total mass of the positive electrode coating layer on the positive electrode current collector before peeling off used in the following examples is as follows:

The mass of the positive electrode plate before peeling off is weighed; the mass of the positive electrode current collector (which can be calculated by thickness) is subtracted; and the result is divided by 2 to obtain the mass of the single-sided coating layer. The mass of the peeled materials can be obtained by subtracting the mass of the positive electrode plate before and after peeling off.

The test method for the thickness of the remaining positive electrode coating layer on the positive electrode current collector accounting for the thickness of the positive electrode coating layer on the positive electrode current collector before peeling off used in the following examples is as follows:

The total thickness of the positive electrode plate before peeling off is measured; the thickness of the positive electrode current collector is subtracted from the total thickness of the positive electrode plate before peeling off, and the result is divided by 2 to obtain the thickness of the single-sided coating layer, recorded as D0. The thickness of the positive electrode coating layer on the peeled surface is measured; the thickness of the positive electrode current collector is subtracted; and the result is divided by 2 to obtain the remaining thickness of the positive electrode coating layer, recorded as D1. The ratio of the two is the account of the thickness of remaining positive electrode coating layer on the positive electrode current collector in the thickness of the positive electrode coating layer on the positive electrode current collector before peeling off.

The test method of the safety test used in the following examples is as follows:

(1) Acupuncture Test:

The battery is fully charged, a 3 mm steel needle is used to pierce the center of the battery perpendicular to the battery plane at a speed of 130 mm/s.

(2) Weight Impact Test:

The battery is fully charged; the battery core is placed on a plane; a steel post with a diameter of 15.8±0.2 mm is placed in the center of the battery core, with the longitudinal axis of the steel column parallel to the plane; and a heavy object with the weight of 9.1±0.1 kg falls freely from a height of 610±25 mm onto the steel post above the center of the battery.

Example 1

The first step is preparing the first coating layer slurry: 40 wt % lithium ferrous phosphate (LFP), 45 wt % modified PVDF and 15 wt % carbon black are mixed; and NMP is further added to the mixture and stirred to prepare a slurry.

The second step is preparing the second coating layer slurry: 97 wt % lithium cobalt oxide, 1 wt % conductive carbon black, 0.8 wt % carbon nanotubes, 1.2 wt % PVDF1 are mixed; and NMP is further added to the mixture and stirred to prepare a slurry.

The third step is preparing negative electrode slurry: 96 wt % artificial graphite, 1 wt % conductive carbon black, 1.5 wt % SBR and 1.5 wt % CMC are mixed; and deionized water is further added to the mixture and stirred to prepare a slurry.

The fourth step is preparing the positive electrode plate: the first coating layer slurry of step 1 is coated on the positive electrode current collector surface by extrusion coating process to form a first coating layer with a thickness of 5 μm, and the second coating layer slurry of step 2 is coated on the first coating layer surface to form a second coating layer with a thickness of 40 μm to obtain a positive electrode plate.

The fifth step is preparing the negative electrode plate: the negative pole slurry of step 3 is coated on the negative pole current collector to obtain the negative electrode plate.

Step 6: the lithium-ion battery is prepared by the process of rolling the positive electrode plate and negative electrode plate, slitting, filming, winding (or lamination), packaging, liquid injection, chemical formation, capacity sorting, and OCV.

Figure 2:
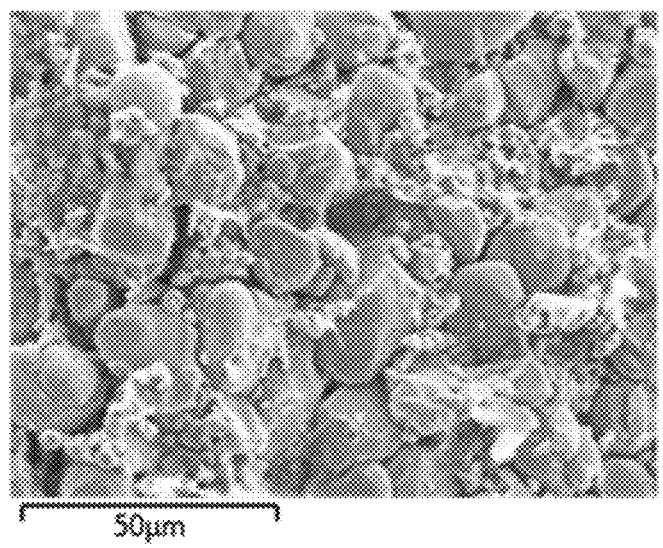
FIG. 2 is SEM of residues on the surface of the electrode plate after the peeling test in Example 1.
Figure 3:
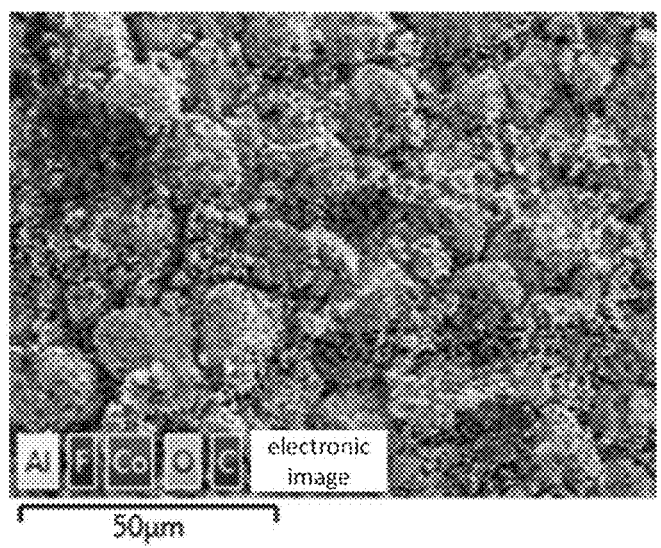
FIG. 3 is a EDS image of residues on the surface of the electrode plate after the peeling test in Example 1.

The prepared lithium-ion battery is subjected to bonding force test. The surface state of the electrode plate after peeling test is shown in FIG. 1, FIG. 2 and FIG. 3. Only part of the particles of the second coating layer is peeled off from the positive electrode plate. Only the lithium cobalt oxide particles of the second coating layer can be detected on the peeled surface of the electrode plate (the Co and O elements are detected by EDS), and the lithium ferrous phosphate particles of the first coating layer are not detected (the P element is not detected by EDS). The average bonding force is 62.65 N/m, indicating that the first coating layer of the positive electrode plate is not peeled off from the positive electrode current collector at this time, indicating that the bonding force between the first coating layer and the positive electrode current collector>62.65 N/m. It can also be shown that the bonding force between the first coating layer and the positive electrode current collector is greater than the bonding force between the first coating layer and the second coating layer. The mass of the remaining coating layer on the peeled positive electrode plate surface divided by the total mass of the single-sided coating layer of the positive electrode plate is 96%.

Figure 4:
FIG. 4 is SEM of the cross-section of the electrode plate after the peeling test in Example 1.

At the same time, the cross-section SEM of the positive electrode plate is shown in FIG. 4. The total thickness of the first coating layer and the second coating layer is 45 μm, and the total thickness of the remaining first coating layer and the remaining second coating layer after being peeled off is between 23 μm and 45 μm. The thickness of the remaining coating layer on the peeled electrode plate surface divided by the thickness of the single-sided coating layer of the positive electrode plate is 51% (calculated based on the minimum coating thickness).

Figure 10:
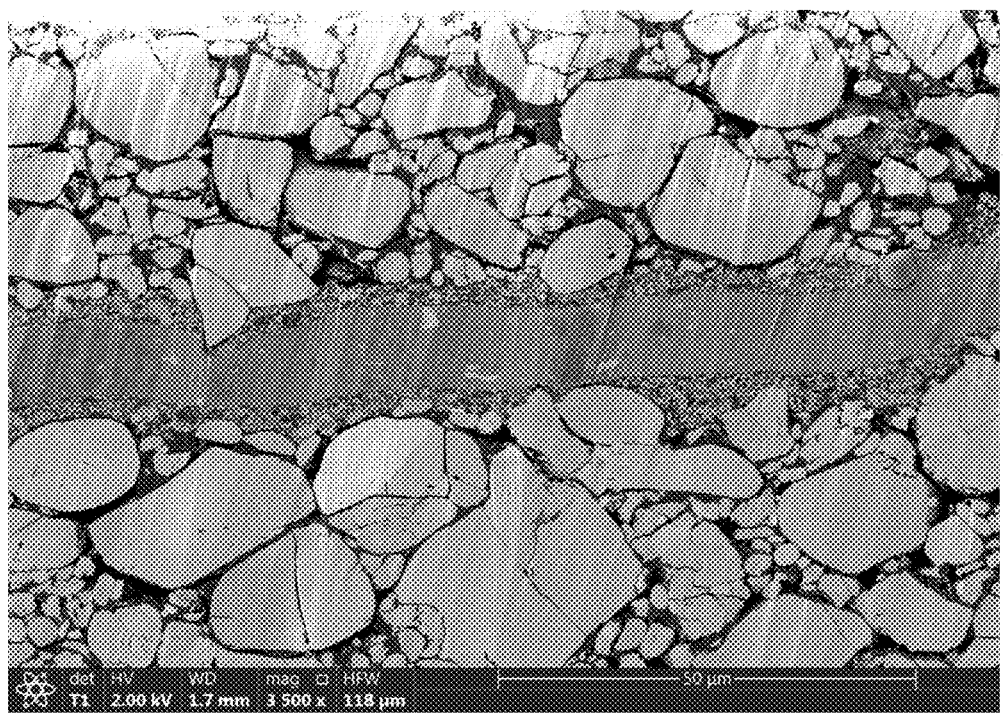
FIG. 10 is SEM of the electrode plate before the peeling test in Example 1.

In addition, FIG. 10 is the SEM of the electrode plate before the peeling test in Example 1. It can be seen from FIG. 10 that the large-diameter particles (positive electrode active material) of the top layer (second coating layer) will be embedded in the bottom layer (first coating layer) due to rolling pressure, so that part of the first binder in the bottom layer (first coating layer) will be in contact with the positive electrode current collector, and part of the first binder will be in contact with the large-diameter particles (positive electrode active material) in the top layer; that is, a structure is formed in which the positive electrode current collector is bonded with a part of the first binder, and a part of the positive electrode active material is bonded with another part of the first binder.

Example 2

The first step: preparing the first coating layer slurry: 93 wt % LFP, 5 wt % modified PVDF, 2 wt % carbon black are mixed, and NMP is further added to the mixture and stirred to prepare a slurry.

The second to sixth steps are the same as those in Example 1.

Figure 5:
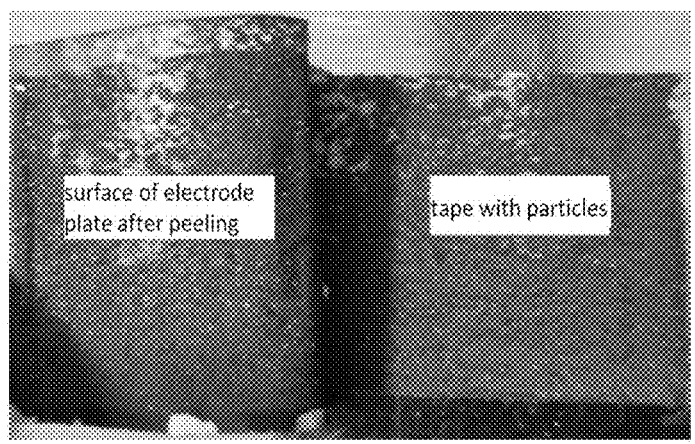
FIG. 5 shows the surface state of the electrode plate after the peeling test in Example 2.
Figure 6:
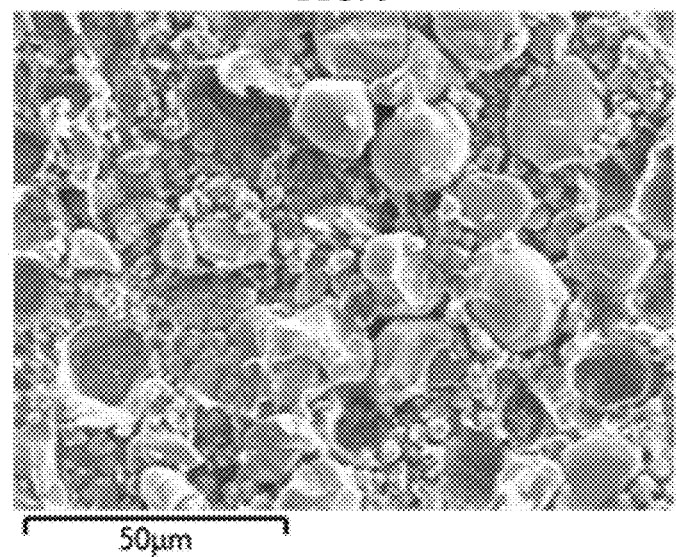
FIG. 6 is SEM of residues on the surface of the electrode plate after the peeling test in Example 2.
Figure 7:
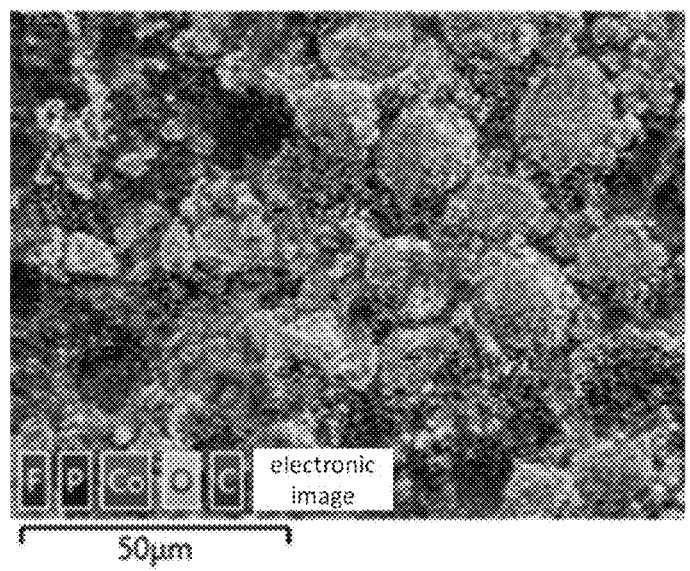
FIG. 7 is a EDS image of residues on the surface of the electrode plate after the peeling test in Example 2.

The prepared lithium-ion battery was subjected to a bonding force test. The surface state of the electrode plate after the peeling test was shown in FIG. 5, FIG. 6 and FIG. 7. Part of the coating layer particles are peeled off from the positive electrode plate, and was peeled off. Co, O and P elements on the peeled electrode plate surface were detected out, indicating that the bonding force between the first coating layer and the current collector was greater than the bonding force between the coating layer particles, and the average bonding electrode force was 45.78 N/m. At this time, the first coating layer of the positive plate did not peel off from the current collector, indicating that the bonding force between the first coating layer and the current collector is >45.78 N/m. It can also be shown that the bonding force between the first coating layer and the positive electrode current collector is greater than the bonding force between the first coating layer and the second coating layer. The mass of the remaining coating layer on the peeled positive electrode plate surface divided by the total mass of the single-sided coating layer of the positive electrode plate is 45%.

Figure 8:
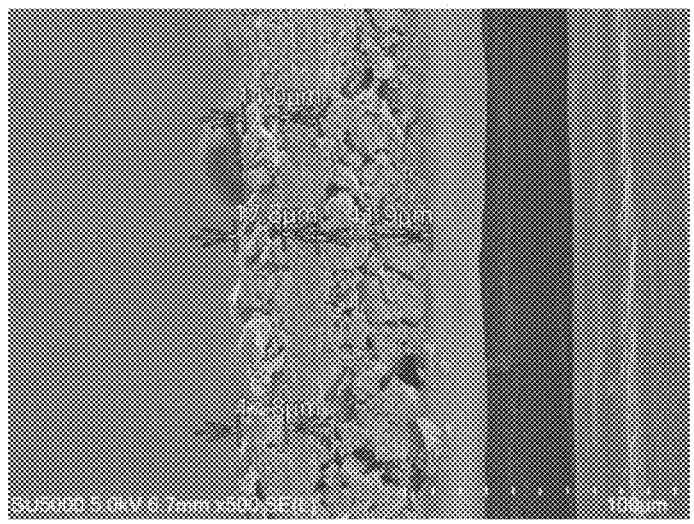
FIG. 8 is SEM of the cross-section of the electrode plate after the peeling test in Example 2.

At the same time, the cross-sectional SEM of the positive electrode plate is shown in FIG. 8. The total thickness of the first coating layer and the second coating layer is 45 μm, and the total thickness of the remaining first coating layer and the remaining second coating layer after peeling off is between 14 μm and 17.8 μm. The thickness of the remaining coating layer on the peeled positive electrode plate surface divided by the thickness of the single-sided coating layer of the positive electrode plate is 31% (calculated based on the minimum thickness of the coating layer).

Examples 3-10

The other steps are the same as in Example 1, and the difference is only in that the selection and content of each material in the first step are different, as shown in Table 1.

Comparative Example 1-2

The other steps are the same as in Example 1, and the difference is only in that the selection and content of each material in the first step are different, as shown in Table 1.

Figure 9:
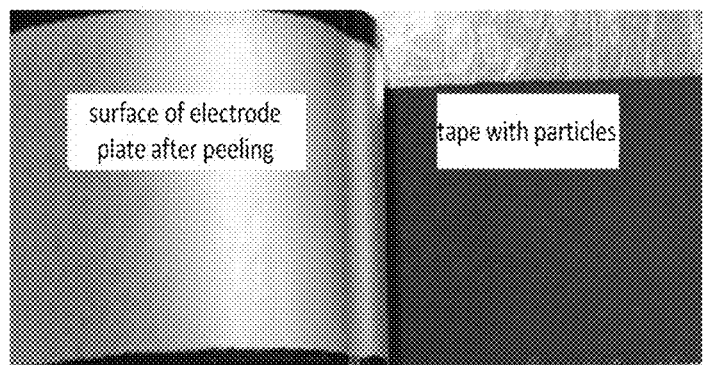
FIG. 9 shows the surface state of the electrode plate after the peeling test in comparative Example 1.

The prepared lithium-ion battery of Comparative Example 1 was subjected to a bonding force test. After the peeling test, the surface state of the electrode plate was shown in FIG. 9. Both the first coating layer and the second coating layer were peeled off from the positive electrode current collector, indicating that the bonding force between the first coating layer and the current collector is smaller than the bonding force between the coating layer particles; and the average bonding force is 8.13 N/m, indicating that the average bonding force between the first coating layer and the current collector is 8.13 N/m.

coating layer of the positive electrode plate is peeled off accounts for more than 5% of the thickness of the positive electrode coating layer on the positive current collector before peeling off; the use of the positive electrode plate can solve the problems such as fire failure of the lithium-ion battery in the case of mechanical misuse and improve the safety performance of the lithium-ion battery, and at the same time the cycle performance of the battery is not affected, which has comparable cycle performance of the existing lithium-ion battery, that is, the safety performance of the lithium-ion battery is significantly improved on the premise of maintaining the cycle performance of the lithium-ion battery.

The examples of the present disclosure have been described above. However, the present disclosure is not limited to the above examples. Any modification, equivalent

TABLE 1

Bonding force and safety test results of electrode plate of each example and comparative example

| Item | First coating layer | The state after the electrode plate is peeled off | Remaining thickness ratio | Remaining mass ratio | Electrode plate bonding force (N/m) | Full charge needling (Pass/test) | Full charge weight impact (Pass/Test) |
|---|---|---|---|---|---|---|---|
| Example 1 | 40% LFP + 45% modified PVDF + 15% carbon black | Part of the particles are peeled off, the aluminum foil is not exposed. | 51% | 96% | 62.65 | 20/20 | 20/20 |
| Example 2 | 93% LFP + 5% modified PVDF + 2% carbon black | | 31% | 45% | 45.78 | 15/20 | 14/20 |
| Example 3 | 40% NCM + 58% modified PVDF + 2% carbon black | | 69% | 98% | 120.95 | 20/20 | 20/20 |
| Example 4 | 80% LCO + 15% modified PVDF + 5% carbon black | | 23% | 60% | 54.24 | 18/20 | 19/20 |
| Example 5 | 25% LFP + 50% LCO + 20% modified PVDF + 5% carbon black | | 49% | 74% | 80.84 | 19/20 | 20/20 |
| Example 6 | 40% NCM + 50% LCO + 5% modified PVDF + 5% carbon black | | 39% | 59% | 51.37 | 15/20 | 19/20 |
| Example 7 | 70% LMO + 25% modified PVDF + 5% carbon black | | 50% | 81% | 63.27 | 20/20 | 19/20 |
| Example 8 | 84% alumina + 12% modified PVDF + 4% carbon nanotubes | | 13% | 16% | 36.64 | 19/20 | 15/20 |
| Example 9 | 76% Boehmite + 15% PVDF1 + 9% Graphene | | 16% | 25% | 42.37 | 16/20 | 19/20 |
| Example 10 | 68% LFP + 12% Alumina + 10% Modified PVDF + 10% Carbon Black | | 11% | 34% | 58.28 | 18/20 | 17/20 |
| Comparative Example 1 | 50% LFP + 40% PVDF2 + 10% carbon black | The coating layer is completely peeled off from the current collector, exposing the aluminum foil. | 0% | 0% | 8.13 | 0/20 | 1/20 |
| Comparative Example 2 | 97% LFP + 1.5% PVDF1 + 1.5% carbon black | | 0% | 0% | 4.21 | 0/20 | 0/20 |

It can be seen from the above examples and comparative examples that when the bonding force between the first coating layer and the positive electrode current collector is greater than 30 N/m; and/or, when the bonding force between the first coating layer and the positive electrode current collector is greater than the bonding force between the first coating layer and the second coating layer; and/or, when the bonding force between the first coating layer and the positive electrode current collector is greater than the bonding force between the positive active material particles of the second coating layer; and/or, when the total mass of the positive electrode coating layer remaining on the positive electrode current collector after the positive electrode coating layer of the positive electrode plate is peeled off accounts for more than 10% of total mass of the positive electrode coating layer on the positive electrode current collector before peeling off; and/or, when the thickness of the positive electrode coating layer remaining on the positive current electrode collector after the positive electrode replacement, improvement made within the spirit and principle of the present disclosure shall be included within the protection scope of the present disclosure.

What is claimed is:

1. A positive electrode plate, comprising: a positive electrode current collector and a positive electrode coating layer, wherein the positive electrode coating layer comprises a first coating layer and a second coating layer, wherein the first coating layer is coated on a surface of the positive electrode current collector, and the second coating layer is coated on a surface of the first coating layer;

the first coating layer comprises an inorganic filler, a first conductive agent and a first binder; the second coating layer comprises a positive electrode active material, a second conductive agent and a second binder;

a content of the first binder in the first coating layer is greater than a content of the second binder in the second coating layer;

wherein the positive electrode active material in the second coating layer is embedded in the first coating layer, the positive electrode current collector is bonded with a part of the first binder, and a part of the positive electrode active material is bonded with another part of the first binder; and wherein the inorganic filler comprises ceramic materials.

2. The positive electrode plate according to claim 1, wherein a bonding force between the first coating layer and the positive electrode current collector is greater than or equal to 35 N/m and less than or equal to 300 N/m.

3. The positive electrode plate according to claim 1, wherein a median particle size D50 of the inorganic filler is smaller than a median particle size D50 of the positive active material.

4. The positive electrode plate according to claim 3, wherein a median particle size D50 of the inorganic filler is 0.05~8 μm;

and/or, a median particle size D50 of the positive electrode active material is 10~20 μm.

5. The positive electrode plate according to claim 1, wherein a mass percentage of each component in the first coating layer is: 40~93 wt % of the inorganic filler, 2~15 wt % of the first conductive agent, and 5~58 wt % of the first binder.

6. The positive electrode plate according to claim 5, wherein a mass percentage of each component in the first coating layer is: 60~91 wt % of the inorganic filler, 3-10 wt % of the first conductive agent, and 8~30 wt % of the first binder.

7. The positive electrode plate according to claim 1, wherein a mass percentage of each component in the second coating layer is: 93~99 wt % of the positive electrode active material, 0.5~5 wt % of the second conductive agent, and 0.5~2 wt % of the second binder.

8. The positive electrode plate according to claim 1, wherein the first binder and the second binder are the same or different, and are at least one independently selected from the group consisting of polyvinylidene fluoride and modified polyvinylidene fluoride;

and/or, a crystallinity of the first binder is less than 40%.

9. The positive electrode plate according to claim 8, wherein the modified polyvinylidene fluoride is acrylate-modified polyvinylidene fluoride;

and/or, a molecular weight of the polyvinylidene fluoride or the modified polyvinylidene fluoride is 1 million Da to 1.5 million Da.

10. The positive electrode plate according to claim 1, wherein the inorganic filler further comprises lithium-containing transition metal oxides.

11. The positive electrode plate according to claim 10, wherein the lithium-containing transition metal oxides comprise at least one selected from the group consisting of lithium cobalt oxide, nickel cobalt manganese ternary material, nickel cobalt aluminum ternary material, nickel cobalt manganese aluminum quaternary material, lithium ferrous phosphate, lithium manganese phosphate, lithium vanadium phosphate, lithium manganate and lithium rich manganese bases.

12. The positive electrode plate according to claim 10, wherein the ceramic materials comprise at least one selected from the group consisting of alumina, boehmite, magnesium oxide, and magnesium hydroxide.

13. The positive electrode plate according to claim 10, wherein the inorganic filler comprises lithium ferrous phosphate, the positive electrode active material comprises lithium cobalt oxide, and after the positive electrode coating layer of the positive electrode plate is peeled off, Co and O elements on the surface of the positive electrode coating layer remaining on the positive electrode current collector are detected by EDS.

14. The positive electrode plate according to claim 1, wherein the positive electrode active material is at least one selected from the group consisting of lithium cobalt oxide, nickel cobalt manganese ternary material, nickel cobalt aluminum ternary material, nickel cobalt manganese aluminum quaternary material, lithium ferrous phosphate, lithium manganese phosphate, lithium vanadium phosphate and lithium manganate.

15. The positive electrode plate according to claim 1, wherein a thickness of the first coating layer is 2~10 μm.

16. The positive electrode plate according to claim 1, wherein a thickness of the second coating layer is 30~80 μm.

17. The positive electrode plate according to claim 1, wherein the positive electrode plate satisfies at least one of the following conditions (1) to (7):

(1) a bonding force between the first coating layer and the positive electrode current collector is greater than 30 N/m;

(2) a bonding force between the first coating layer and the positive electrode current collector is greater than a bonding force between the first coating layer and the second coating layer;

(3) a bonding force between the first coating layer and the positive electrode current collector is greater than a bonding force between positive electrode active material particles of the second coating layer;

(4) after the positive electrode coating layer of the positive electrode plate is peeled off, a maximum thickness of the positive electrode coating layer remaining on the positive electrode current collector is greater than or equal to 2 μm;

(5) a thickness of the positive electrode coating layer remaining on the positive electrode current collector after the positive electrode coating layer of the positive electrode plate is peeled off accounts for more than 5% of a thickness of the positive electrode coating layer on the positive electrode current collector before peeling off;

(6) a total mass of the positive electrode coating layer remaining on the positive electrode current collector after the positive electrode coating layer of the positive electrode plate is peeled off accounts for more than 10% of a total mass of the positive electrode coating layer on the positive electrode current collector before peeling off; and (7) a total area of the positive electrode coating layer remaining on the positive electrode current collector after the positive electrode coating layer of the positive electrode plate is peeled off accounts for more than 70% of a total area of the positive electrode coating layer before peeling off.

18. A lithium-ion battery, comprising the positive electrode plate of claim 1.

* * * * *